United States Patent
Shin et al.

(10) Patent No.: US 8,017,096 B2
(45) Date of Patent: Sep. 13, 2011

(54) METHOD OF REMOVING MERCURY FROM EXHAUST GAS USING CHLORINE COMPOUND

(75) Inventors: Dong Nam Shin, Kyungsangbook-do (KR); Dong Jun Koh, Kyungsangbook-do (KR); Youngchul Byun, Kyungsangbook-do (KR); Kiman Lee, Kyungsangbook-do (KR)

(73) Assignee: Research Institute of Industrial Science & Technology, Kyungsangbook-Do (KR)

( * ) Notice: Subject to any disclaimer, the term of this patent is extended or adjusted under 35 U.S.C. 154(b) by 0 days.

(21) Appl. No.: 12/743,604

(22) PCT Filed: Jul. 17, 2009

(86) PCT No.: PCT/KR2009/003984
§ 371 (c)(1),
(2), (4) Date: Jun. 9, 2010

(87) PCT Pub. No.: WO2010/008253
PCT Pub. Date: Jan. 21, 2010

(65) Prior Publication Data
US 2011/0052468 A1    Mar. 3, 2011

(30) Foreign Application Priority Data
Jul. 17, 2008  (KR) .................. 10-2008-0069595

(51) Int. Cl.
*B01D 53/64* (2006.01)
(52) U.S. Cl. ........................................ 423/210
(58) Field of Classification Search .............. 423/210
See application file for complete search history.

(56) References Cited

U.S. PATENT DOCUMENTS

| | | | |
|---|---|---|---|
| 6,294,139 B1 | 9/2001 | Vicard et al. | |
| 6,808,692 B2 | 10/2004 | Oehr | |
| 6,855,859 B2 | 2/2005 | Nolan et al. | |
| 7,264,784 B2 | 9/2007 | Kuma et al. | |
| 7,514,052 B2 | 4/2009 | Lissianski et al. | |
| 7,524,471 B2 | 4/2009 | Lindau | |
| 7,544,338 B2 | 6/2009 | Honjo et al. | |
| 7,582,271 B2 | 9/2009 | Parrish et al. | |
| 7,628,967 B2 | 12/2009 | Johnson | |
| 7,871,586 B2 | 1/2011 | Harada et al. | |
| 2006/0239877 A1* | 10/2006 | Johnson et al. | ........ 423/210 |
| 2007/0154374 A1* | 7/2007 | Johnson et al. | ........ 423/210 |

FOREIGN PATENT DOCUMENTS

| | | |
|---|---|---|
| JP | 63100918 | 5/1988 |
| JP | 63315136 | 12/1988 |
| JP | 2001-162135 A | 6/2001 |
| JP | 2001162135 A | 6/2001 |
| JP | 2002239343 A | 8/2002 |
| JP | 2005125213 A | 5/2005 |

(Continued)

OTHER PUBLICATIONS

Search Report for PCT/KR2009/003984 dated Mar. 2, 2010, 3 pages.

(Continued)

*Primary Examiner* — Timothy C Vanoy
(74) *Attorney, Agent, or Firm* — Dority & Manning, P.A.

(57) ABSTRACT

There is provided an effective method for removing mercury comprising injecting $NaClO_2$ into an emission gas containing elemental mercury and $NO_x$; converting the elemental mercury to oxidized mercury by using oxidizing agents produced by the $NaClO_2$ and the $NO_x$; and removing oxidized mercury from the emission gas.

4 Claims, 1 Drawing Sheet

FOREIGN PATENT DOCUMENTS

| | | |
|---|---|---|
| JP | 2005-230810 | 9/2005 |
| JP | 2005230810 A | 9/2005 |
| JP | 2005528210 A | 9/2005 |
| KR | 10-2002-0044537 A | 6/2002 |
| KR | 20020044537 A | 6/2002 |
| KR | 10-2007-0040752 | 4/2004 |
| KR | 20070040752 A | 4/2007 |
| WO | WO 96/09108 A1 * | 3/1996 |
| WO | WO 03103810 A1 | 12/2003 |
| WO | WO 2006132347 A1 | 12/2006 |

OTHER PUBLICATIONS

International Search Report for PCT/KR2009/003984, (2010).

Abstract—Yoon, et al., "Combined SOx, NOx and Mercury Control Technology from the Flue Gas", *Prospectives of Industrial Chemistry*, vol. 8, No. 1, 2005.

Abstract—Si-Hyun Lee, "Gax-Phase Mercury Control Technology from Flue Gas", *Journal of The Korean Society for Energy Engg.*, (2003), vol. 12, No. 2, pp. 65-73.

* cited by examiner

METHOD OF REMOVING MERCURY FROM EXHAUST GAS USING CHLORINE COMPOUND

CROSS REFERENCE TO RELATED APPLICATION

This application is the national stage entry of International Patent Application No. PCT/KR2009/003984 having a filing date of Jul. 17, 2009, which claims filing benefit of Korean Patent Application Number 10-2008-0069595 having a filing date of Jul. 17, 2008.

BACKGROUND OF THE INVENTION

1. Field of the Invention

The present invention relates to a method for effectively removing elemental mercury contained in emission gas by using chlorinated compounds, and more particularly, to a method for removing elemental mercury contained in emission gas by converting elemental mercury, which may be difficult to remove by using the prior art, to oxidized mercury, which can be removed easily, by using strong oxidizing agents, such as OClO, ClO, ClOO, Cl, $Cl_2$, and transient Cl species produced by the reaction of $NO_x$ contained in emission gas with $NaClO_2$ injected from the outside.

2. Description of the Related Art

In general, mercury is harmless to humans and the environment, since it is commonly present in the form of an alloy (amalgam) with other metals, or in an HgS form when reacted with sulfur in nature. However, when mercury is reduced to elemental mercury by the high temperatures generated by various combustions, for example, a steel making process, a sintering process, a coal-fired power plant or a waste incineration process, then elemental mercury is released in the form of emission gas and it may harm both humans and the environment. Poisonous mercury, such as elemental mercury, oxidized mercury and particulate mercury, reacted with various chemicals contained in emission gas are released into the atmosphere.

Particularly, the composition rate of mercury compounds contained in emission gasses generated by combustion depends on the amount of chlorine, the amount of sulfur and the combustion temperature of raw materials. In general, when the amount of halogen compounds and sulfur in a raw material are relatively high, the content of oxidized mercury is increased. However, elemental mercury, among mercury compounds generated by combustion, may be hard to remove as compared to oxidized mercury and particulate mercury, due to the low reactivity thereof. Therefore, attempts at oxidizing elemental mercury, which may be hard to remove by using the air pollution control facilities of prior art, into oxidized mercury, have been researched in the past.

Among the methods for converting elemental mercury into oxidized mercury, injecting chemicals available for oxidizing elemental mercury into high temperature emission gasses is more easily available for the conversion than others. U.S. Patent publication Nos. 2005/0255022 and 2008/0060520, and Korean Patent Laid-Open Publication No. 2007-0040752 disclose a method for removing elemental mercury by using hydrogen peroxide. Further, U.S. Patent publication No. 2003/0161771 discloses injecting molecular halogen or a thermo-labile molecular halogen precursor generating molecular halogen into emission gas by using a pyrolysis reaction and using chemicals, such as $Ca(OCl)_2$, $MgBr_2$ and $KI_3$ for oxidizing elemental mercury. U.S. Patent publication No. 2005/0147549 and Japanese Patent Laid-Open Publication No. 2005-230810 disclose a method for injecting an ammonium salt, such as $NH_4Cl$, $NH_4Br$, and $NH_4I$, into high temperature emission gasses at the rear end of a combustion chamber. U.S. Patent publication No. 2007/0202020 discloses the attempt to oxidize elemental mercury by injecting $NH_4Cl$, HCl, and $Cl_2$ into emission gasses.

In addition, U.S. Pat. No. 6,294,139 and Korean Patent No. 0367140 disclose a method for producing materials available for oxidizing elemental mercury by the reaction of $NaClO_2$ with HCl contained in a scrubbing solution as the oxidation process of elemental mercury in a wet scrubber. Similarly, U.S. Patent publication No. 2002/0068030 and Korean Patent Laid-Open Publication No. 2002-0044537 also disclose using $HClO_x$ (x=1, 2, 3, 4) and salt as an aqueous solution of chlorine oxi-acids used in the oxidation process of elemental mercury by using a wet scrubber.

The various examples of prior art above relate to a method for oxidizing elemental mercury in high temperature emission gases. However, there are problems in that the prior arts make use of a wet scrubber, or the fact that when the temperature of emission gas is decreased, the reactivity of the generated HX (X=Cl, Br, I) with mercury is decreased, the generated HX can therefore be reacted with the unreacted $NH_3$ again, and thereby the generated salt can block the gas pipe. Also, there is a problem in that using and handling HX and $X_2$ (X=Cl, Br, I) injected as mercury-oxidizing agents requires close attention because HX and $X_2$ are corrosive gasses, and need a special handling and containment apparatuses at additional cost.

SUMMARY OF THE INVENTION

An aspect of the present invention provides a method for effectively and easily removing elemental mercury from an emission gas.

An aspect of the present invention also provides a method for removing a small amount of mercury contained in an emission gas without great expense for equipment and operations.

According to an aspect of the present invention, there is provided a method of removing oxidized mercury for the above-mentioned purposes, in which the method includes injecting $NaClO_2$ into emission gas containing elemental mercury and $NO_x$, converting the elemental mercury into oxidized mercury using oxidizing agents produced by the reaction of the $NaClO_2$ with $NO_x$, and removing oxidized mercury from the emission gas. In this case, the $NaClO_2$ may be injected in the form of a powder, an aqueous solution phase, or a powder and aqueous solution mixed phase, and the oxidizing agents may be one, two or more selected from the group consisting of OClO, ClO, ClOO and $Cl_2$ produced by gas phase reaction and gas phase—solid phase reaction with $NaClO_2$. Further, the oxidized mercury may be one, two or more selected from the group consisting of HgO, HgOCl and $HgCl_2$. Further, the removing of the oxidized mercury may be performed by using one or two methods selected from the group consisting of an electrostatic precipitator, a bag filter, and a wet scrubber or a wet desulfurization system.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
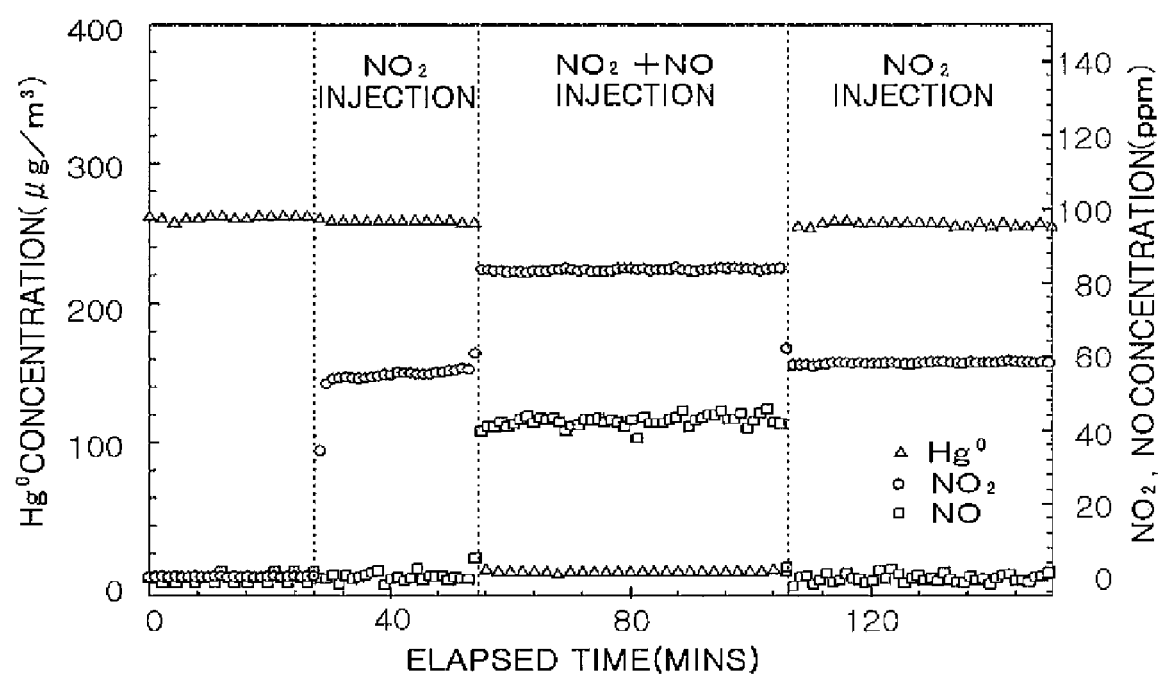
FIG. 1 is a graph showing the results of experiments for removing elemental mercury by using products produced by the reaction of $NO_x$ with $NaClO_2$.

Exemplary embodiments of the present invention will now be described in detail with reference to the accompanying drawings.

According to the present invention, there is provided a method for removing elemental mercury contained in an emission gas using $NaClO_2$, the method including producing mercury in the form of an Oxide from elemental mercury by facilitating an oxidation of elemental mercury using $OClO$, $ClO$, $ClOO$, $Cl$ and $Cl_2$, in which the $OClO$, $ClO$, $ClOO$, $Cl$ and $Cl_2$ are produced by the reaction of $NO_x$ contained in emission gas with $NaClO_2$, which is injected in the form of a powder or an aqueous solution of $NaClO_2$ into an emission gas containing elemental mercury, whereby the $OClO$, $ClO$, $ClOO$, $Cl$ and $Cl_2$ can oxidize elemental mercury; and removing the oxidized mercury from the emission gas.

The present invention will now be described in detail.

As described above, the present invention involves a method for effectively oxidizing elemental mercury into oxidized mercury from an economical and technological perspective, by injecting chemicals additives into an emission gas in order to solve the problems of the prior art as well as for effectively removing elemental mercury, which may be difficult to remove by using the air pollution control facilities of the prior art. When elemental mercury is converted to oxidized mercury according to the present invention, the mercury solubility is increased as depicted in the following Table 1.

TABLE 1

Solubility of Elemental Mercury and Oxidized Mercury

| Characteristic | Hg | HgO | $HgCl_2$ |
|---|---|---|---|
| Water Solubility (μg/l) 20° C., 1 atm | 20 | 69,000,000 | 53,000 @25□ |

If the solubility of oxidized mercury is increased, it may be the easiest and most economical way to remove mercury from an emission gas. Particularly, unlike the above-mentioned prior art, the present invention involves a method for effectively converting elemental mercury into oxidized mercury, because $OClO$, $ClO$, $ClOO$, $Cl$ and $Cl_2$ can be sufficiently produced in the gas phase, in which the $OClO$, $ClO$, $ClOO$, $Cl$ and $Cl_2$ can effectively oxidize elemental mercury by the chemical reaction of $NO_x$ present in an emission gas with the $NaClO_2$ powder or aqueous solution injected into the emission gas. Also, applying an electrostatic precipitator, a bag filter, and a wet scrubber can remove the oxidized mercury.

In the present invention, $NaClO_2$ powder or an aqueous solution thereof is initially injected for producing strong oxidizing agents, which can oxidize elemental mercury contained in the emission gas into oxidized mercury. Once an aqueous solution of $NaClO_2$ is injected into the emission gas, the water contained in the $NaClO_2$ mist is vaporizing due to the high temperature of the emission gas, and $NaClO_2$ having a size of several microns becomes present in emission gas. The injected $NaClO_2$ particles and $NO_x$, which may be generally present in the emission gas, may lead to a gas-solid phase reaction (see the following reactions (1) and (2)).

$$NO + NaClO_2 \rightarrow NO_2 + NaCl + NaClO_3 \quad (1)$$

$$NO_2 + NaClO_2 + \tfrac{1}{2}O_2 \rightarrow OClO + NaNO_3 \quad (2)$$

In addition, $OClO$, $ClO$, $ClOO$, $Cl$ and $Cl_2$, as strong oxidizing agents which can oxidize elemental mercury via the following reactions (3) through (8), are produced.

$$OClO + NO \rightarrow NO_2 + ClO \quad (3)$$

$$ClO + NO \rightarrow NO_2 + Cl \quad (4)$$

$$Cl + OClO \rightarrow ClO + ClO \quad (5)$$

$$Cl + Cl \rightarrow Cl_2 \quad (6)$$

$$ClO + ClO \rightarrow Cl_2 + O_2 \quad (7)$$

$$ClO + ClO \rightarrow ClOO + Cl \quad (8)$$

The oxidizing agents obtained are reacted with elemental mercury to produce $HgO$, $HgOCl$ and $HgCl_2$. In this case, the subsequent reactions are represented by the following reactions (9) through (19).

$$Hg^0 + OClO \rightarrow HgO + ClO \quad (9)$$

$$Hg^0 + ClO \rightarrow HgO + Cl \quad (10)$$

$$Hg^0 + ClO + M \rightarrow HgOCl + M \quad (11)$$

$$HgOCl + O_2 \rightarrow HgO + ClOO \quad (12)$$

$$Hg^0 + ClOO \rightarrow HgCl + O_2 \quad (13)$$

$$Hg^0 + ClOO \rightarrow HgO + ClO \quad (14)$$

$$Hg^0 + Cl + M \rightarrow HgCl + M \quad (15)$$

$$Hg^0 + Cl_2 \rightarrow HgCl + Cl \quad (16)$$

$$HgCl + Cl \rightarrow HgCl_2 \quad (17)$$

$$HgCl + Cl_2 \rightarrow HgCl_2 + Cl \quad (18)$$

$$Hg^0 + Cl_2 + M \rightarrow HgCl_2 \quad (19)$$

Using an electrostatic precipitator, a bag filter, and a wet scrubber or wet desulfurization system can easily remove the converted oxidized mercury in the form of an oxide.

The present invention will now be described in detail with reference to the Example. However, the following Example is only intended for describing the present invention in detail, and the spirit and scope of the invention will not be limited by the following Example.

EXAMPLE

In an emission gas temperature condition of 130° C., emission gas containing 150 ppm $NO_2$ is passed through a fluidized bed of 1.2 g $NaClO_2$ at a flow rate of 2.6 l/m in the rear end of a combustion chamber, and then 1 l/m gas containing 260 μg/m³ of an elemental mercury concentration is injected for reaction, such that elemental mercury is not reacted.

However, when injecting 200 ppm NO along with the gas in the rear end of a combustion chamber, elemental mercury is 100 percent converted into oxidized mercury. In this case, when the injection of NO is stopped, elemental mercury is not oxidized.

In other words, in this embodiment of the present invention, $NO_2$ is reacted with $NaClO_2$ to produce $OClO$, but $OClO$ is not separately included for the oxidation of elemental mercury due to the low reactivity of $OClO$ and mercury, while when presenting NO along with OClO, the produced OClO and NO are rapidly reacted to produce ClO, and ClO, ClOO, Cl and $Cl_2$, which can be key factors in the oxidation of elemental mercury through reactions mentioned in the following Table 2. In this processing, No is oxidized to $NO_2$, and elemental mercury is oxidized to HgO, HgOCl and $HgCl_2$.

As set forth above, according to exemplary embodiments of the present invention, a small amount of mercury contained in an emission gas can be effectively removed without great expense by generating oxidizing agents available for effectively oxidizing elemental mercury by injecting $NaClO_2$ into the emission gas.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for removing elemental mercury, comprising:
    injecting NaClO2 into an emission gas containing elemental mercury and NOx;
    converting the elemental mercury into oxidized mercury by using oxidizing agents produced by the reaction of the NaClO2 with the NOx; and
    removing oxidized mercury from the emission gas, wherein the oxidizing agent is one, two or more selected from the group consisting of OClO, ClO, ClOO, and Cl2 produced by a gas phase reaction or gas phase-solid phase reaction with NaClO2.

2. The method of claim 1, wherein the NaClO2 is injected in the form of a powder, an aqueous solution phase, or a powder and aqueous solution mixed phase.

3. The method of claim 1, wherein the oxidized mercury is one, two or more selected from the group consisting of HgO, HgOCl and HgCl2.

4. The method of claim 1, wherein the removing of the oxidized mercury is performed by using one or two methods selected from the group consisting of electrostatic precipitator, bag filter, and wet scrubber or wet desulfurization system.

* * * * *